US012140274B2

(12) United States Patent
Vouriot et al.

(10) Patent No.: US 12,140,274 B2

(45) Date of Patent: Nov. 12, 2024

(54) SUPPLY TANK FOR INFLAMMABLE GAS WITH PROTECTIVE CAP

(71) Applicant: Vomar Industries Inc., La Salle (CA)

(72) Inventors: Marcel Joseph Andre Vouriot, La Salle (CA); Robert Amborsky, Winnipeg (CA); Patrick Badiou, Sanford (CA); Sean Oosterveen, Winnipeg (CA)

(73) Assignee: Vomar Industries Inc., La Salle (CA)

( * ) Notice: Subject to any disclaimer, the term of this patent is extended or adjusted under 35 U.S.C. 154(b) by 146 days.

(21) Appl. No.: 17/989,928

(22) Filed: Nov. 18, 2022

(65) Prior Publication Data

US 2024/0167636 A1 May 23, 2024

(51) Int. Cl.
*F17C 13/06* (2006.01)
*F17C 13/02* (2006.01)

(52) U.S. Cl.
CPC .............. *F17C 13/06* (2013.01); *F17C 13/02* (2013.01); *F17C 2201/0109* (2013.01); *F17C 2205/0305* (2013.01); *F17C 2205/0308* (2013.01); *F17C 2205/0323* (2013.01); *F17C 2205/0382* (2013.01); *F17C 2223/0123* (2013.01)

(58) Field of Classification Search
CPC ......................... F17C 13/06; F17C 2205/0308
See application file for complete search history.

(56) References Cited

U.S. PATENT DOCUMENTS 3,776,412 A * 12/1973 Mink ....................... F17C 13/06 220/726
2007/0284380 A1* 12/2007 Busby ..................... F17C 13/06 220/727
2011/0278316 A1* 11/2011 Herzer .................... F17C 13/06 137/382
2022/0128198 A1* 4/2022 Kriese ................... F17C 13/002

FOREIGN PATENT DOCUMENTS

| | | | |
|---|---|---|---|
| CA | 3211309 | 9/2022 | |
| GB | 1442433 | 7/1976 | |
| GB | 2380732 | 4/2003 | |
| KR | 20-0423765 | 8/2006 | |
| KR | 10-2341701 | 12/2021 | |
| WO | WO-2013115720 A1 * | 8/2013 | ............. F16K 1/307 |

* cited by examiner

*Primary Examiner* — Don M Anderson
(74) *Attorney, Agent, or Firm* — Adrian D. Battison; Ade & Company Inc.; Ryan W. Dupuis

(57) ABSTRACT

A propane tank of less than 4 pounds includes a tank body with a collar welded in an opening and a cylindrical valve receptacle threaded into a female screw thread in the collar with a valve body in a central passage. A protection cap has an upper wall and a peripheral wall which engages onto the outside of the collar and is spaced outwardly of the valve receptacle so as to define a crush area to receive impact loads. The upper wall includes a ring which extends into and engages a wider section of the passage and a projecting pin which extends into and engages into the passage adjacent the valve body to provide an additional seal. The peripheral wall defines a female thread on a plurality of displaceable sections so that the cap can be pushed axially on to a male screw thread on the collar and unscrewed.

18 Claims, 8 Drawing Sheets

SUPPLY TANK FOR INFLAMMABLE GAS WITH PROTECTIVE CAP

This invention relates to a protective cap for a tank for inflammable gas including the structure of the tank itself. In particular it pertains to a protective cap for a refillable tank or container with a valve for controlling discharge and re-filling of the tank.

BACKGROUND OF THE INVENTION

Typical LPG or propane storage tanks, bottles, containers or cylinders have a valve device on the top or head of the tank which could be vulnerable to damage if dropped or falling over. An impact on the valve that is sufficient to break the valve from its threaded attachment to the tank can lead to a very dangerous accident. For this reason, tanks are required to have some protection around the valve. Typical 4 to 40 pound propane tanks which are portable for gas grills and the like have a welded metal ring surrounding the valve for protection.

Smaller tanks under 4 pounds propane capacity built to standard specifications TC 4BAM16 and DOT 4BA 240 in North America and built to other standard specifications around the world can be used for camping equipment and torches do not use such a protective metal ring, primarily due to weight reasons but also in some cases they are used for hand held devices where the ring would be obtrusive. Currently small refillable propane tanks, built to specification 39, only have a thin plastic disposable cap which protects the threads of the valve but does nothing to prevent damage to the valve's attachment to the tank should it be dropped or knocked over.

The tanks to which the present invention relates are typically known as a cylinder which is a container designed and manufactured in accordance with a cylinder specification authorized for the containment and transportation of propane under the Transportation of Dangerous Goods (TOG) Regulations of Transport Canada. The protection cap disclosed herein would typically only be used on cylinders. In general tanks are stationary and cylinders are transportable.

SUMMARY OF THE INVENTION

It is one object of the present invention to provide a refillable supply tank for containing an inflammable gas which includes an improved protective cap which cooperates with the tank to provide an improved protection and access.

According to a first aspect of the invention there is provided a refillable supply tank for an inflammable gas comprising:

- a tank body defining a container with a wall surrounding a hollow interior for receiving the gas and an opening in the wall;
- a collar mounted in the opening and attached to the wall at the opening, the collar defining a central bore to allow gas to escape from the interior and to allow refillable gas to be fed into the interior;
- a generally cylindrical valve receptacle distinct from the collar and carrying an external male screw thread engaged into an internal female screw thread in the bore of the collar;
- the valve receptacle defining an axial passage therethrough extending from an end face of the valve receptacle into the interior of the tank body;

- a valve body in the passage arranged to seal the passage against escape of the gas and operable to open the passage to allow the escape when required;
- and a valve protection cap for covering the valve receptacle with the valve body therein and at least part of the collar;
- the valve protection cap including an upper wall and at least one depending peripheral wall;
- the valve protection cap including at least one engagement surface thereon which engages onto the outside of the collar.

In one preferred arrangement, the collar has an outer peripheral surface of a larger diameter than an outer peripheral surface of the valve receptacle so that the engagement surface of the valve protection cap is spaced outwardly of the outer peripheral surface of the valve receptacle. In this arrangement preferably the peripheral wall is spaced outwardly of the outer peripheral surface of the valve receptacle so as to define an open shoulder area outside the end face of the valve receptacle underneath the upper wall of the valve protection cap which acts as a crush area to receive impact loads. In this way the plastic cap can deform into the space defined to take up the impact loads to reduce the forces on the valve itself.

In one preferred arrangement, the upper wall of the valve protection cap engages the end face of the valve receptacle. This can act therefore as a secondary or further seal to reduce the amount of released gas should the valve itself fail.

In one preferred arrangement, the upper wall of the valve protection cap at the end face of the valve receptacle includes a ring underneath the upper wall which extends into and engages the passage to transfer loading between the valve receptacle and the valve protection cap. This also can act again as a further sealing action.

In one preferred arrangement, the upper wall at the end face of the valve receptacle also include a projecting pin underneath the upper wall which extends into and engages into the passage adjacent the valve body to provide a further supplementary seal with the passage to supplement the seal of the valve body in the passage. Thus all of the above features can be used in combination to provide the best load transfer and sealing actions relative to prior art arrangements.

In one preferred arrangement, the valve protection cap includes an annular skirt extending downwardly from the depending peripheral wall into engagement with the actual wall of the tank surrounding the opening so as to transfer impact loads from the valve protection cap to the wall of the tank independently of the loads transferred at the valve assembly.

In one preferred arrangement, the annular skirt extends downwardly into engagement with the tank wall around the opening from a position adjacent the engagement surfaces so that the skirt and the peripheral wall are relatively small and closely surround the valve arrangement.

In another preferred arrangement, the annular skirt extends downwardly into engagement with the wall from a position adjacent the upper wall. In this case the peripheral wall and the skirt are much larger with the intention to engage the tank upper wall at a position adjacent its outer edge.

In one preferred arrangement, the outside of the collar includes an external male screw thread and the engagement surface of the valve protection cap defines a female thread on a plurality of separate radially outwardly and inwardly displaceable sections so that the valve protection cap can be pushed axially on to the male screw thread while the sections are displaced inwardly whereupon the sections extend by spring force outwardly to engage into the male thread thus requiring the cap to be removed rotationally by unscrewing the sections from the male thread.

In one preferred arrangement, there is a tear off tab projection outwardly from one side of the depending peripheral wall which disconnects from the peripheral wall by pulling by the user when first used thus providing an indication of use but leaving the peripheral wall intact to allow refillable on the collar.

In one preferred arrangement, the depending peripheral wall is formed as a complete surface fully which surrounds the collar without openings.

According to a further aspect of the invention there is provided a refillable supply tank for an inflammable gas comprising:

a tank body defining a container with a wall surrounding a hollow interior for receiving the gas and an opening in the wall;

a valve receptacle engaged into the opening and defining an axial passage therethrough extending from an end face of the valve receptacle into the interior of the tank body;

a valve body in the passage arranged to seal the passage against escape of the gas and operable to open the passage to allow the escape when required;

and a valve protection cap for covering the valve receptacle with the valve body therein;

the valve protection cap including an upper wall and at least one depending peripheral wall;

said at least one depending peripheral wall of the valve protection cap including at least one engagement surface thereon which engages around the valve receptacle;

wherein said at least one depending peripheral wall is spaced outwardly of an outer peripheral surface of the valve receptacle so as to define an open shoulder area outside the end face of the valve receptacle underneath the upper wall of the valve protection cap which acts as a crush area to receive impact loads.

According to a further aspect of the invention there is provided a refillable supply tank for an inflammable gas comprising:

a tank body defining a container with a wall surrounding a hollow interior for receiving the gas and an opening in the wall;

a valve receptacle engaged into the opening and defining an axial passage therethrough extending from an end face of the valve receptacle into the interior of the tank body;

a valve body in the passage arranged to seal the passage against escape of the gas and operable to open the passage to allow the escape when required;

and a valve protection cap for covering the valve receptacle with the valve body therein;

the valve protection cap including an upper wall and at least one depending peripheral wall;

said at least one depending peripheral wall of the valve protection cap including at least one engagement surface thereon which engages around the valve receptacle;

wherein the upper wall of the valve protection cap at the end face of the valve receptacle includes a ring underneath the upper wall which extends into and engages the passage to transfer loading between the valve receptacle and the valve protection cap.

According to a further aspect of the invention there is provided a refillable supply tank for an inflammable gas comprising:

a tank body defining a container with a wall surrounding a hollow interior for receiving the gas and an opening in the wall;

a valve receptacle engaged into the opening and defining an axial passage therethrough extending from an end face of the valve receptacle into the interior of the tank body;

a valve body in the passage arranged to seal the passage against escape of the gas and operable to open the passage to allow the escape when required;

and a valve protection cap for covering the valve receptacle with the valve body therein;

the valve protection cap including an upper wall and at least one depending peripheral wall;

said at least one depending peripheral wall of the valve protection cap including at least one engagement surface thereon which engages around the valve receptacle;

wherein there is provided an external male screw thread and wherein said at least one engagement surface of the valve protection cap defines a female thread on a plurality of separate radially outwardly displaceable sections whereby the valve protection cap can be pushed axially on to the male screw thread and can be removed rotationally by unscrewing the sections from the male screw thread.

According to a further aspect of the invention there is provided a refillable supply tank for an inflammable gas comprising:

a tank body defining a container with a wall surrounding a hollow interior for receiving the gas and an opening in the wall;

a valve receptacle engaged into the opening and defining an axial passage therethrough extending from an end face of the valve receptacle into the interior of the tank body;

a valve body in the passage arranged to seal the passage against escape of the gas and operable to open the passage to allow the escape when required;

and a valve protection cap for covering the valve receptacle with the valve body therein;

the valve protection cap including an upper wall and at least one depending peripheral wall;

said at least one depending peripheral wall of the valve protection cap including at least one engagement surface thereon which engages around the valve receptacle;

wherein there is a tear off tab projection outwardly from one side of said at least one depending peripheral wall which disconnects from the peripheral wall providing an indication of use but leaving the peripheral wall intact to allow refillable on the tank body.

According to a further aspect of the invention there is provided a refillable supply tank for an inflammable gas comprising:

a tank body defining a container with a wall surrounding a hollow interior for receiving the gas and an opening in the wall;

a valve receptacle engaged into the opening and defining an axial passage therethrough extending from an end face of the valve receptacle into the interior of the tank body;

a valve body in the passage arranged to seal the passage against escape of the gas and operable to open the passage to allow the escape when required;

and a valve protection cap for covering the valve receptacle with the valve body therein;

the valve protection cap including an upper wall and at least one depending peripheral wall;

said at least one depending peripheral wall of the valve protection cap including at least one engagement surface thereon which engages around the valve receptacle;

wherein said at least one depending peripheral wall as a surface which fully surrounds the collar without openings.

Thus the above features provide a number of unique features including:

—a— The double seal, where the cap pin slides up and down to allow for thermal expansion and contraction of the cap. Previous caps used in the prior art are similar to pop bottle caps with a sealable cap liner. However this poorly compensates for thermal expansion and contraction.

—b— The push on screw off small cap. Push on tear off caps used in this application have been provided for propane cylinders. These caps often have angled teeth but not in a thread pattern. In this way when pushed on they have also to be pulled off by sliding over the threads. In this case typically there is a tear off strip which tears part of the peripheral wall so that it is no longer intact and provides reduced protection when replaced.

—c— Drop force loading is transferred to the valve and cylinder with the majority to the cylinder.

BRIEF DESCRIPTION OF THE DRAWINGS

A more complete appreciation of the invention and many of the advantages thereof will be readily obtained as the same becomes better understood by reference to the detailed description when considered in connection with the accompanying drawings, wherein.

DETAILED DESCRIPTION

Figure 1:
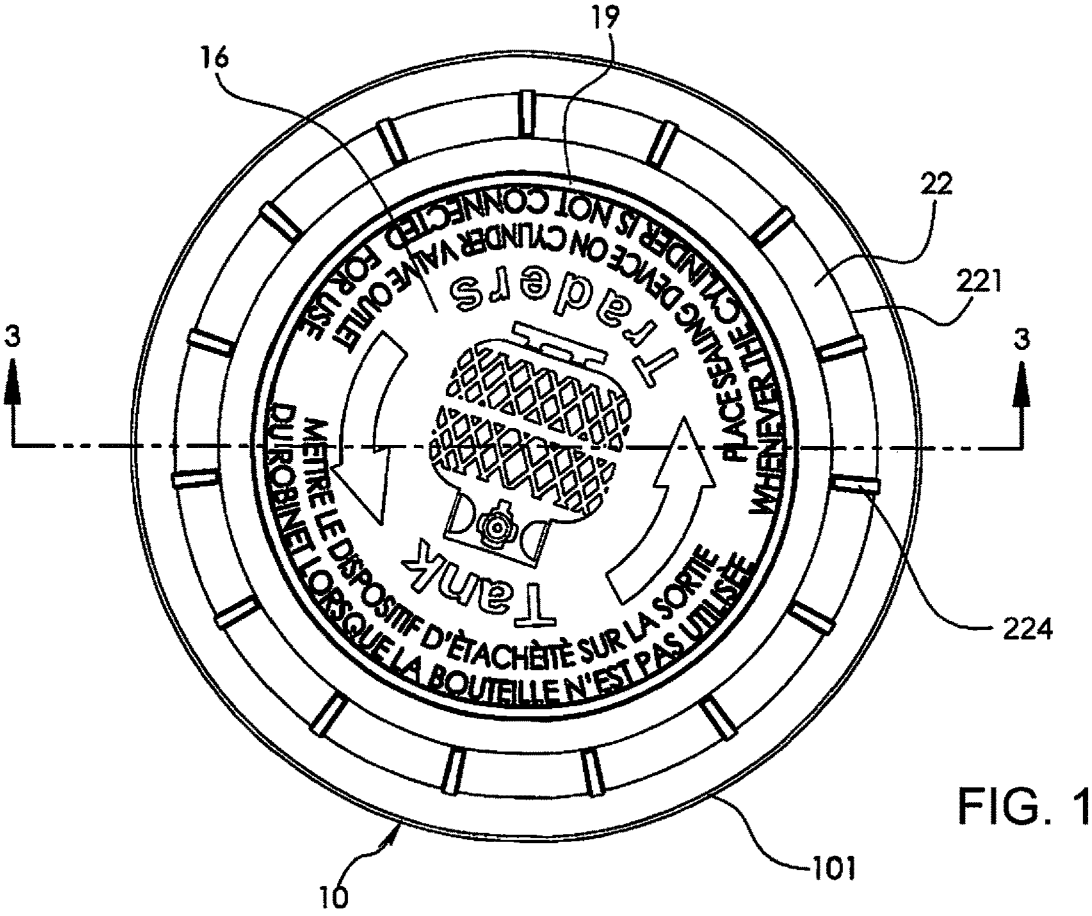
FIG. 1 is top plan view of a first embodiment of the protective cap and a typical tank it is designed to protect.

The protective cap described herein is preferred to be made of an injection molded plastic, although other materials could be used. The cap installs onto the valve by threading it onto the cylinder collar's male threads, but it could also snap over the threads. An embodiment of the cap may be capable of performing a secondary seal with the outlet of the main service valve, such that if the tank's main service valve leaked, the cap will seal the tank and prevent dangerous accidental discharge of the flammable gas.

The supply tank for propane or other inflammable gas as shown in the figures includes a tank body 10 of a sheet metal defining a container with a wall 101 surrounding a hollow interior 102 for receiving the gas and an opening 103 in the wall typically at a top of the wall. The tank has a cylindrical shape with the top wall converging inwardly and upwardly smoothly to the top opening. A base of the tank as shown in the FIGS. 5 to 11 is typically flat to stand upright on a flat surface.

A metal collar 11 is welded into the opening and attached to the wall at the opening the collar. The collar includes am outer ring 111 which sits on the top wall of the tank at the opening and is welded to the top wall by a surrounding bead 112. Below the ring the collar is reduced in diameter so as to form a cylindrical portion 113 which projects into the tank through the opening to a bottom end 114 located within the tank below the top wall.

On an outer surface of the ring 111 is provided a male screw thread 115 which extends upwardly around the ring to a top edge 116 of the ring located above the top wall of the tank.

The collar defines a central bore 117 extending through the full height of the collar and carrying a female screw thread 119 in a lower section and an annular recess 118 of greater diameter in an upper section at the upper end 116. The collar is typically formed of steel to weld to the steel tank to provide the required strength to contain the gas under pressure as determined by safety rules.

A generally cylindrical valve receptacle 12 carries on a lower cylindrical portion an external male screw thread 121 which is engaged into the internal female screw thread 119 in the bore of the collar. The receptacle 12 is typically formed of brass so that it is distinct from the collar and is formed as a separate component to be threaded into the collar. Thus the tank itself is separate from the valve assembly defined by the receptacle.

The receptacle 12 has a ring 122 at the top of the thread 121 so that an O-ring 13 can be compressed between a bottom of the ring 122 and the top of the portion 113 of the collar 11 to provide a seal between the receptacle and the collar.

The receptacle further has an upper portion 123 with a male thread 124 to receive a fitting from the appliance to be fed with the gas. At a top of the thread 124 is provided a horizontal top face 125.

The valve receptacle 12 defines an axial passage 126 therethrough extending from the upper end face 125 of the valve receptacle into the interior 102 of the tank body to allow gas to escape from the interior and to allow refillable gas to be fed into the interior. The passage includes a lower generally threaded cylindrical portion 127 shaped to confine a Schrader valve 14 and an upper portion 128 of larger diameter breaking out on to the upper face 125. The valve receptacle 12 and the collar thus cooperate to form a valve support component mounted in-the opening and defining an axial passage therethrough extending from an end face of the valve support component into the interior of the tank body.

The Schrader valve 14 includes a valve body in the passage arranged to seal the passage against escape of the gas and operable to open the passage to allow the escape when required. The valve as is well known includes an upper pin 141 to operate the valve when required.

Figure 2:
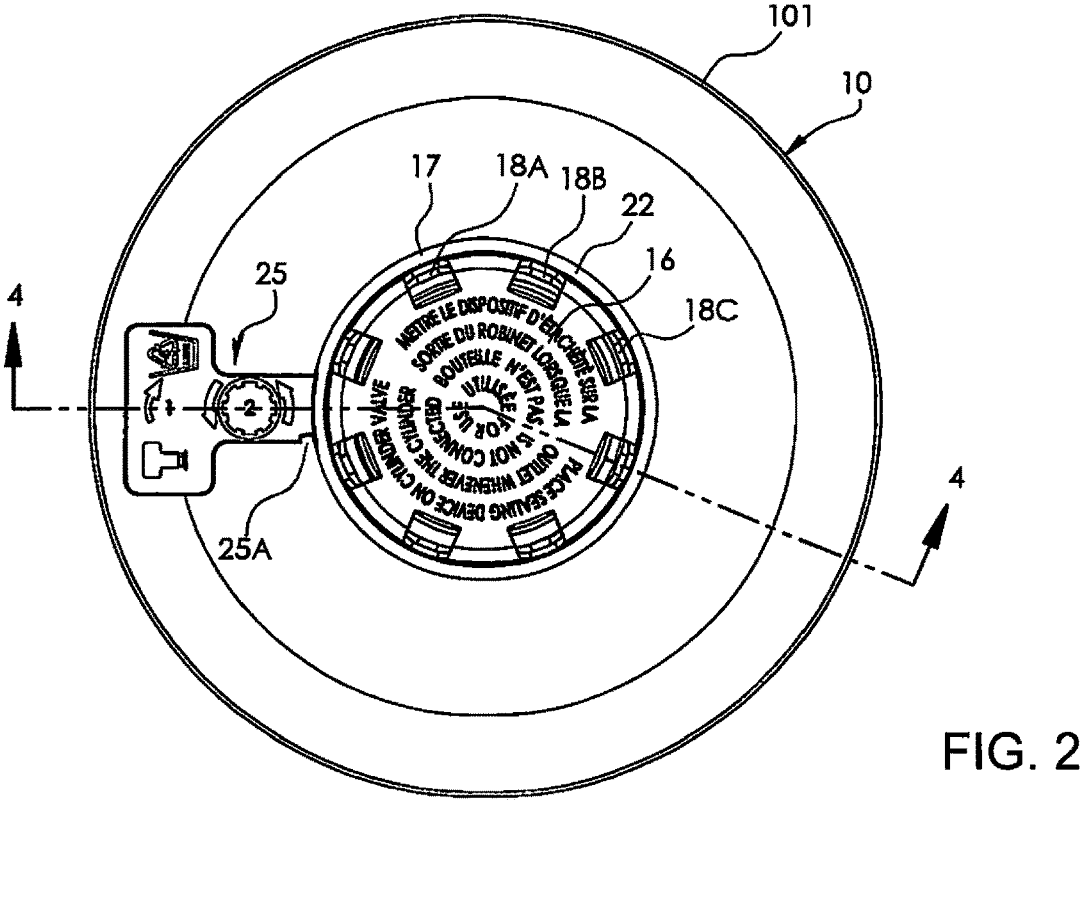
FIG. 2 is top plan view of a first embodiment of the protective cap and a typical tank it is designed to protect.
Figure 3:
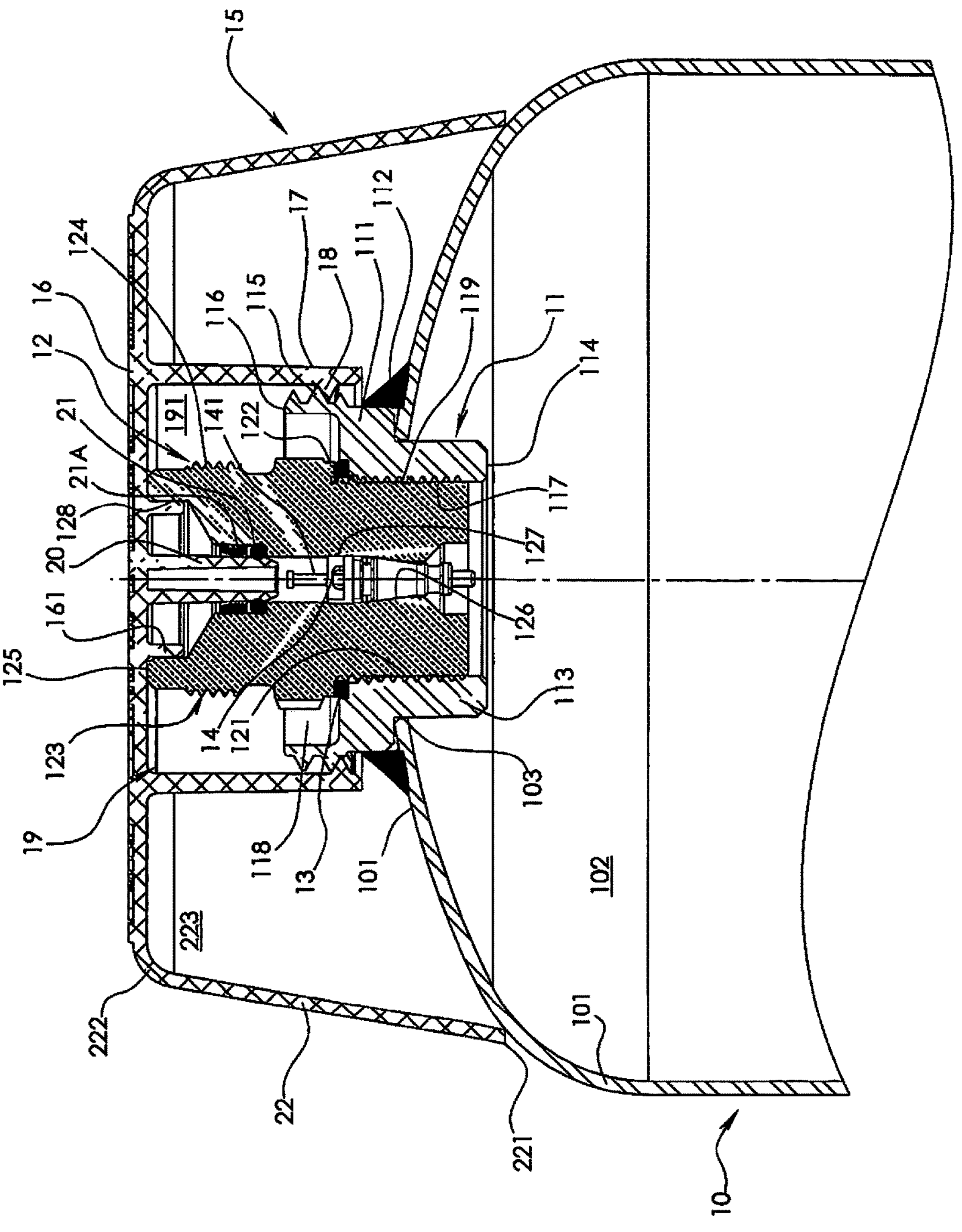
FIG. 3 is a cross sectional view through the first embodiment of the protective cap along the lines 3-3 of FIG. 1.
Figure 4:
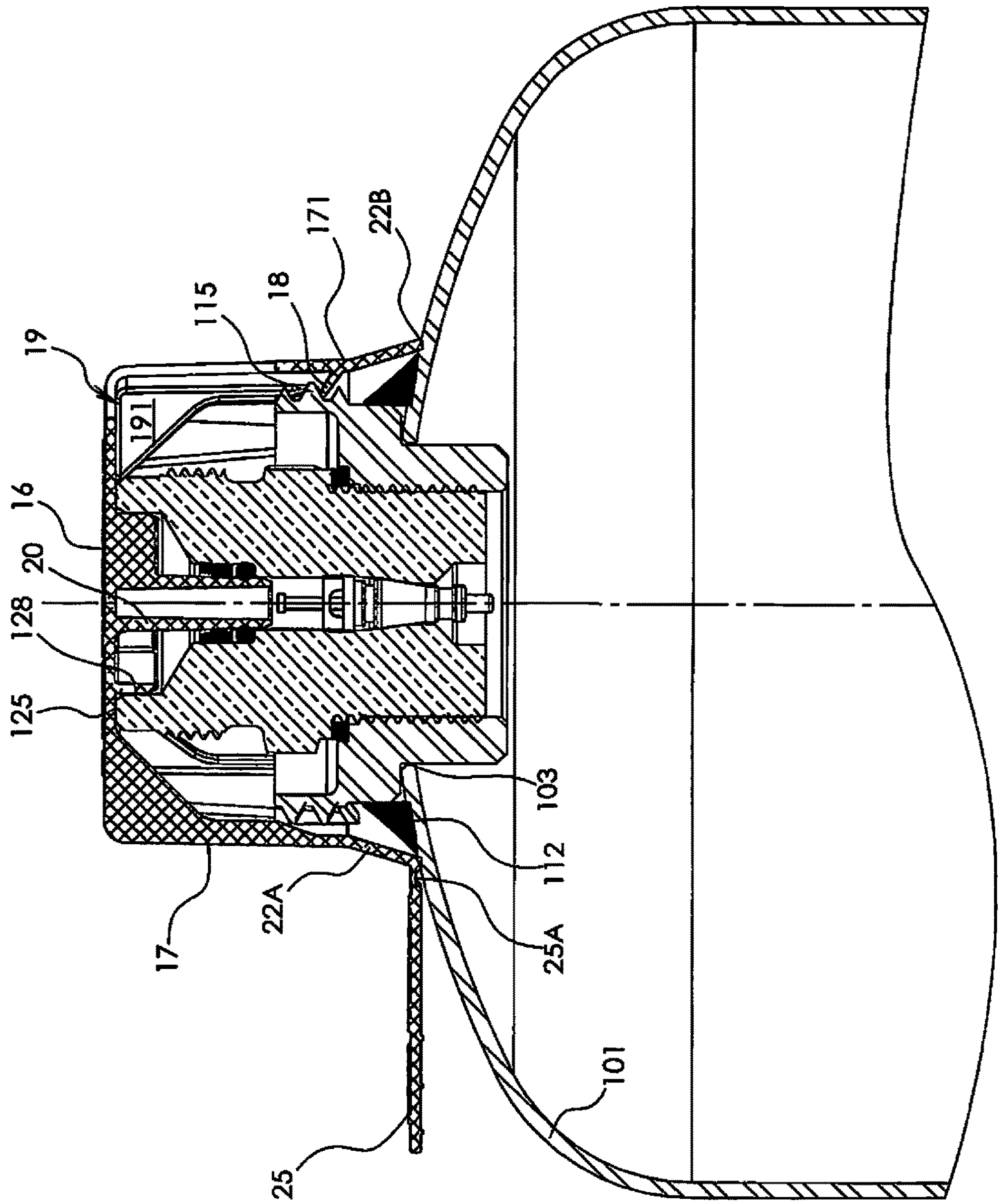
FIG. 4 is a cross sectional view through the first embodiment of the protective cap along the lines 4-4 of FIG. 2.
Figure 5:
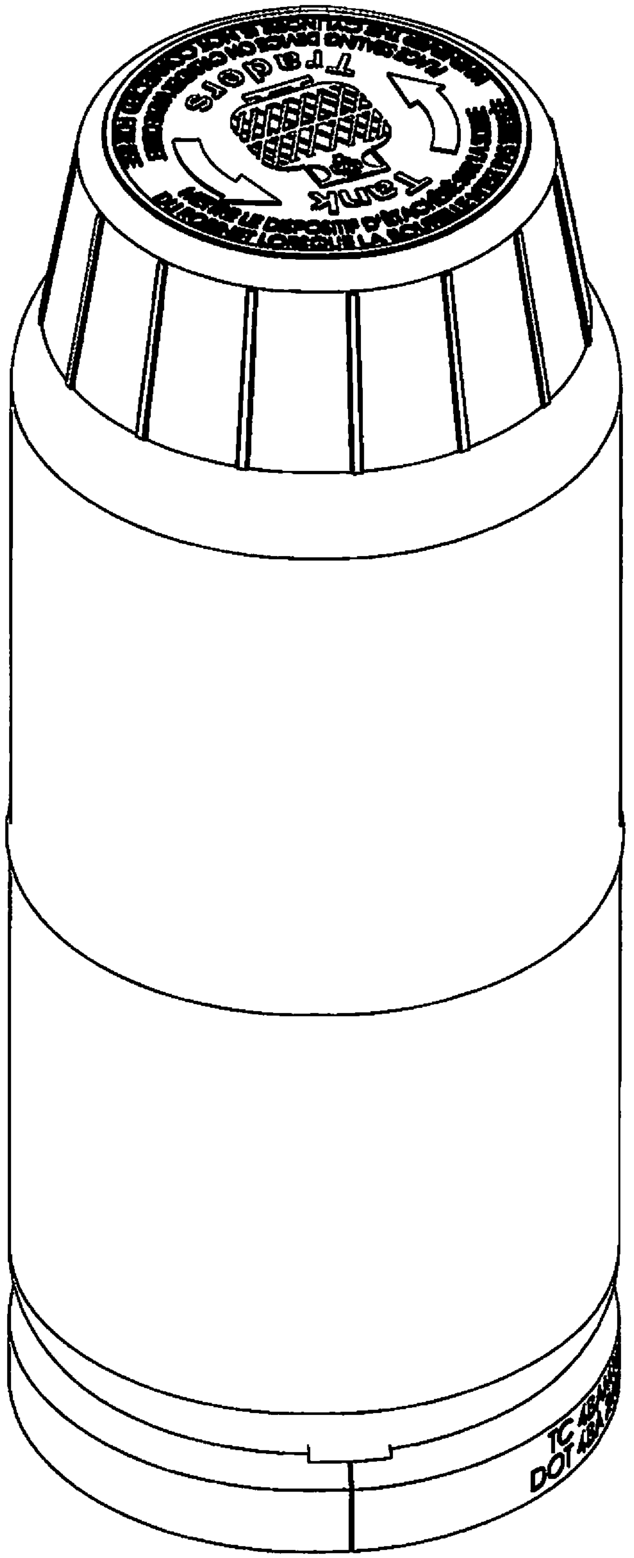
FIG. 5 is an isometric view of the tank and protective cap of FIG. 1.
Figure 6:
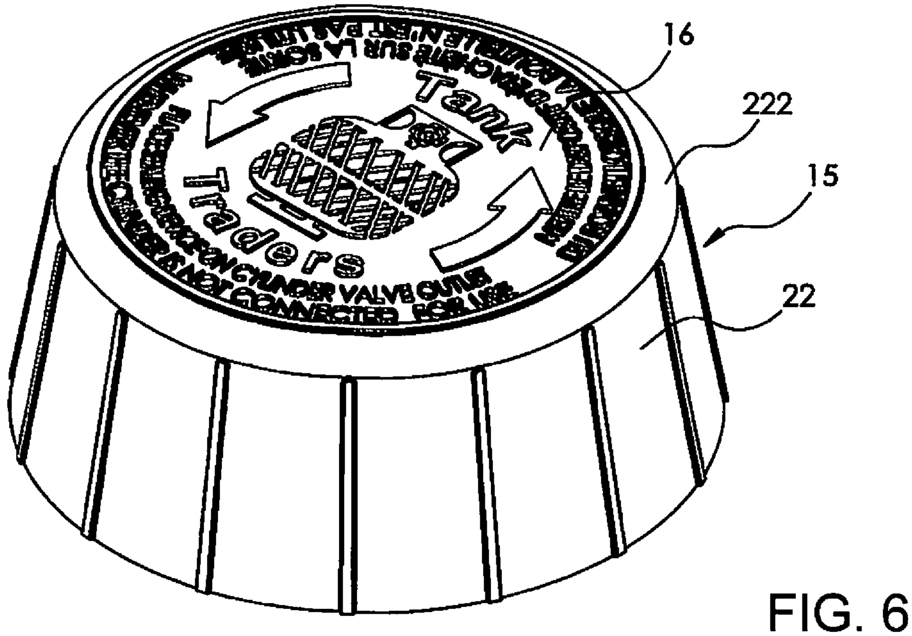
FIG. 6 is an isometric view of the protective cap of FIG. 1 from the top and one side.
Figure 7:
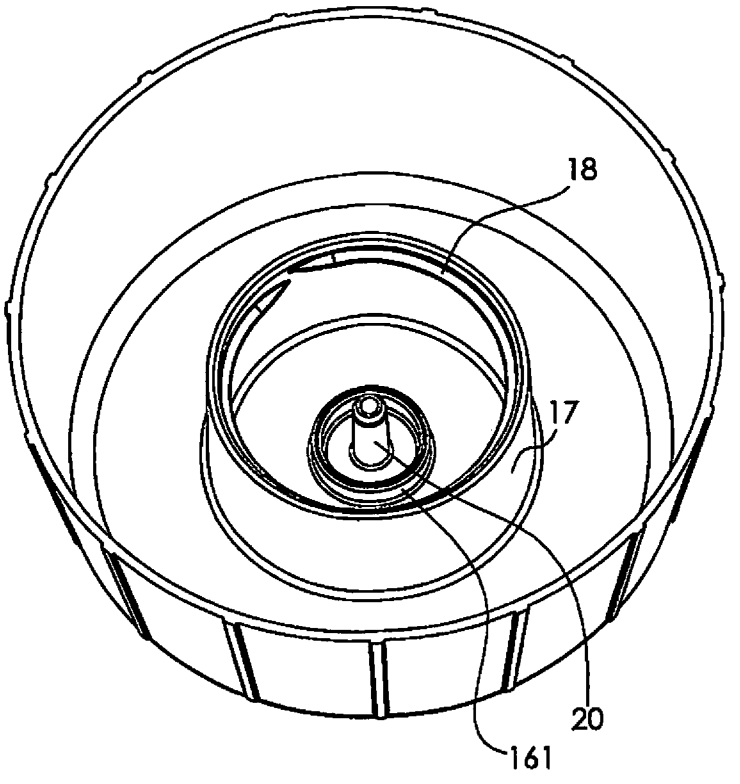
FIG. 7 is an isometric view of the protective cap of FIG. 1 from the bottom and one side.
Figure 8:
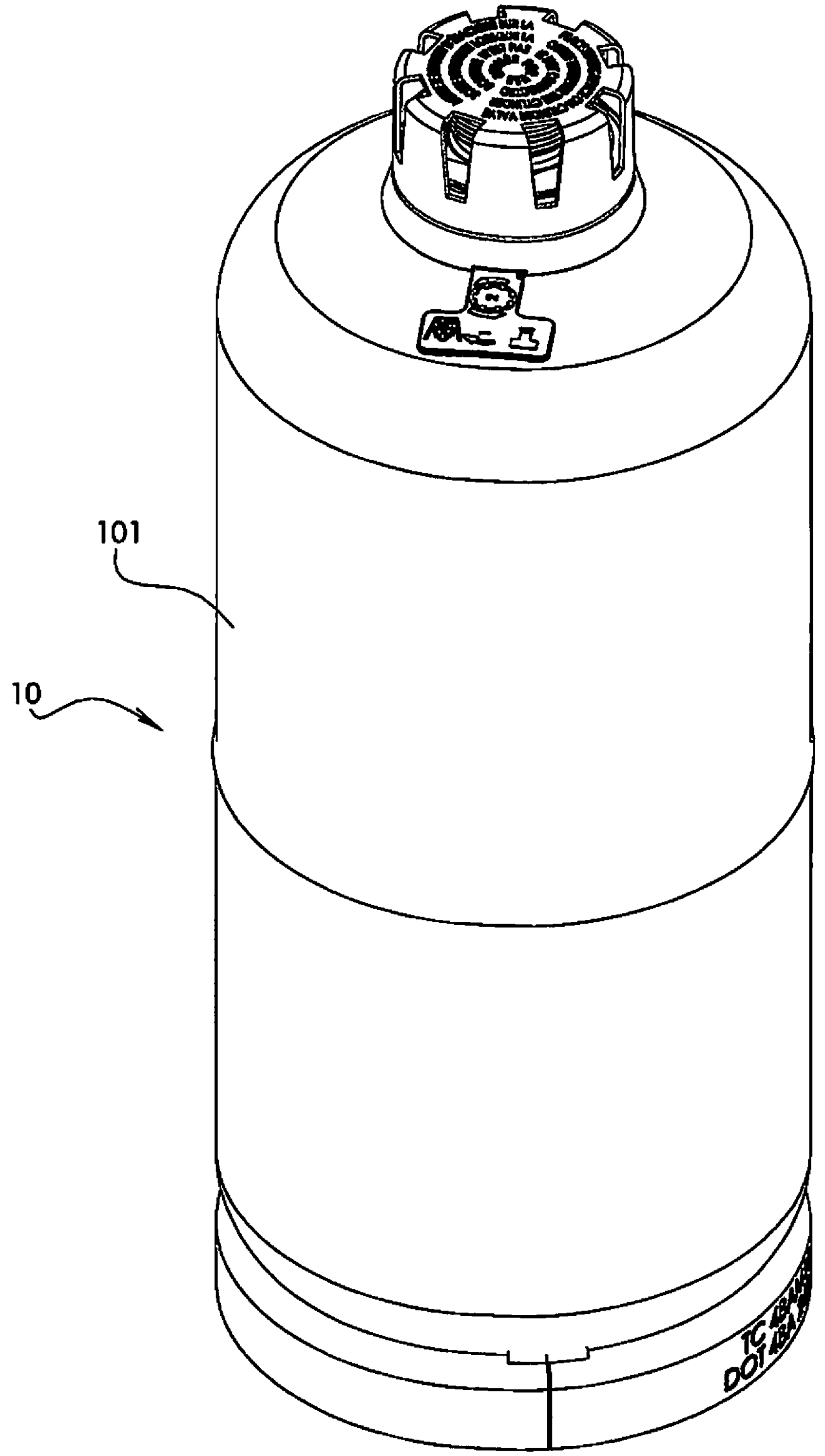
FIG. 8 is an isometric view of the tank and protective cap of FIG. 2.
Figure 9:
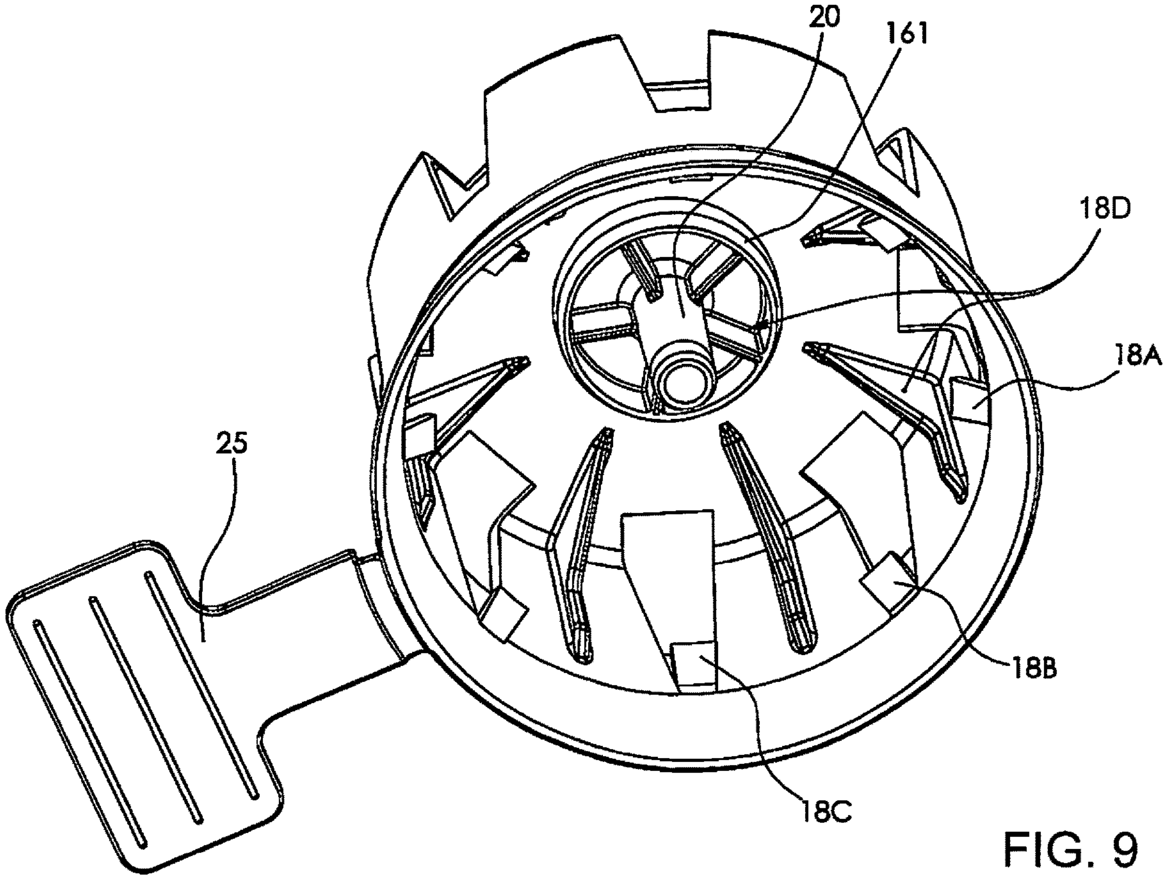
FIG. 9 is an isometric view of the protective cap of FIG. 2 from the top and one side.
Figure 10:
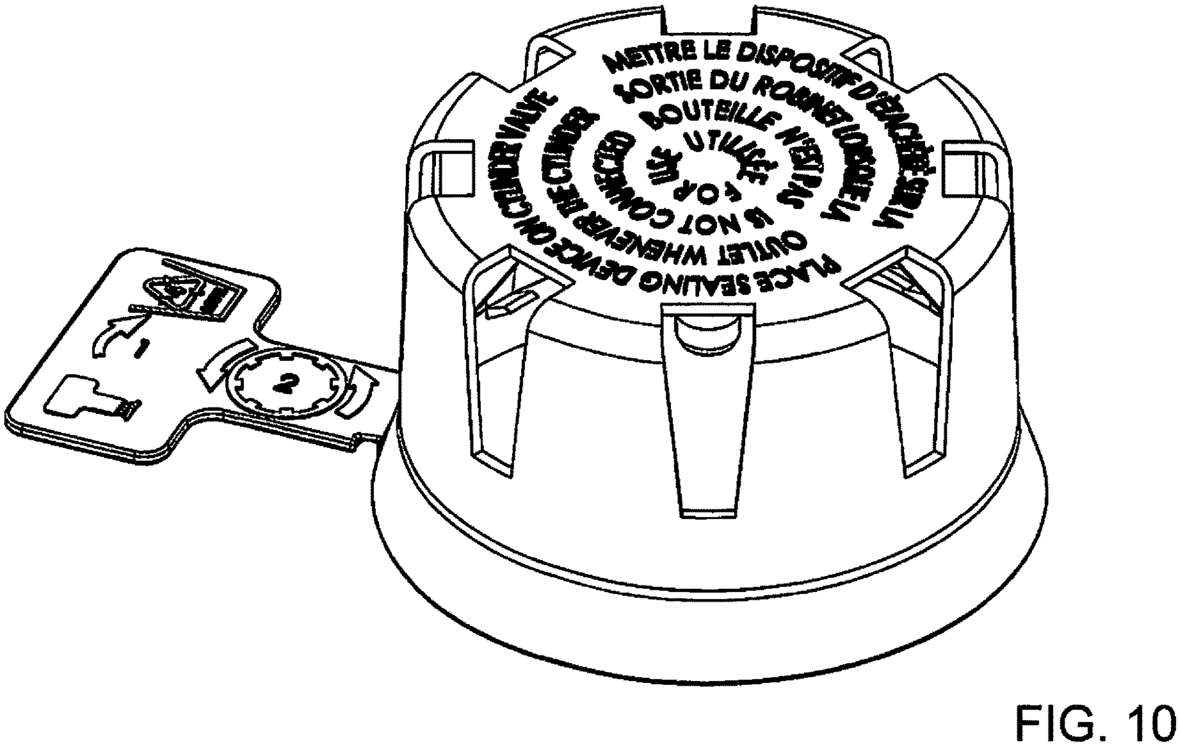
FIG. 10 is an isometric view of the protective cap of FIG. 2 from the bottom and one side.
Figure 11:
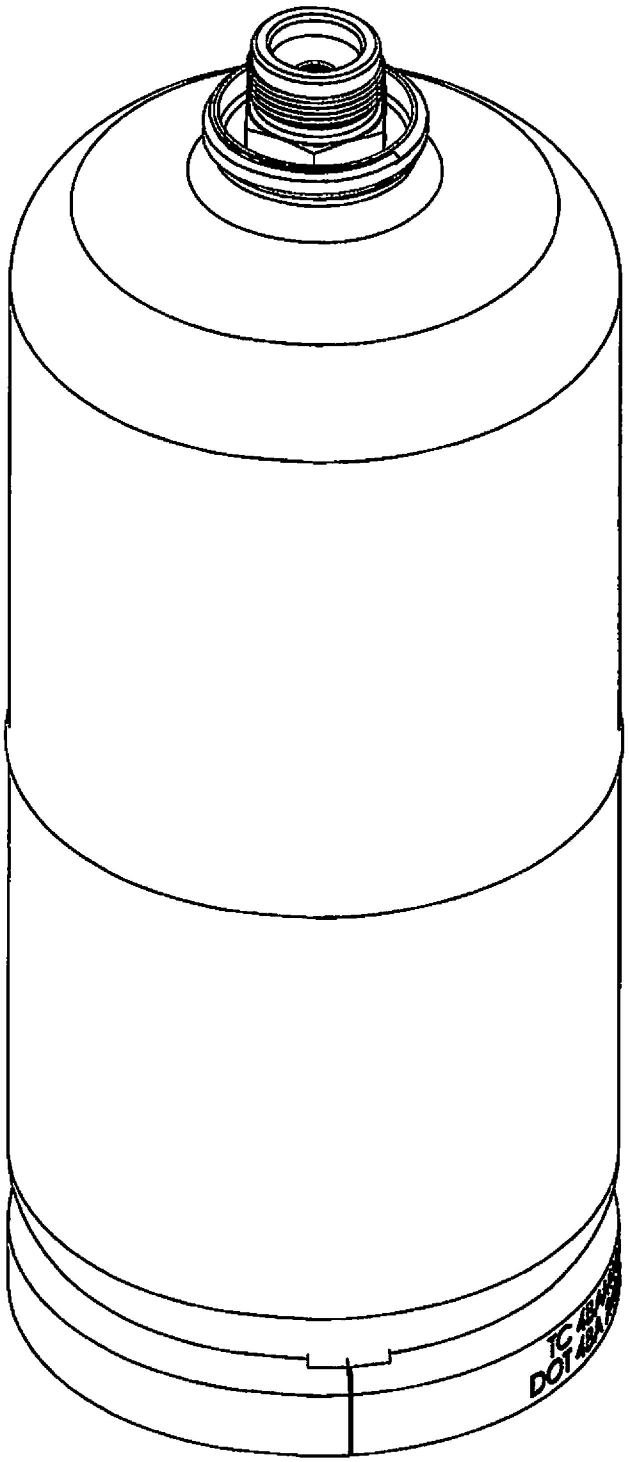
FIG. 11 is an isometric view of the tank with the protective cap removed from the top and one side.

The above construction is common to the first embodiments of FIGS. 1 and 3 and to the second embodiment of FIGS. 2 and 4.

Both embodiments include a valve protection cap 15 for covering valve support component and particularly the valve receptacle 12 thereof with the valve body 14 and the collar 111. The valve protection cap 15 includes an upper wall 16, at least one depending peripheral wall 17 and at least one engagement surface 18 thereon which engages onto the outside of the collar to hold the cap in place on the tank. The valve protection cap thus includes an upper wall and at least one depending peripheral wall which extends-around the valve support component.

As set out above, the collar has an outer peripheral surface at the male thread 115 of a larger diameter than an outer peripheral surface of the valve receptacle at the thread 124 so that the engagement surface 18 defined by a female thread of the valve protection cap 15 is spaced outwardly of the outer peripheral surface of the valve receptacle at the thread 124. This defines an open shoulder area 19 outside the end face 125 of the valve receptacle 12 underneath the upper wall 16 of the valve protection cap which provides a space 191 acts as a crush area to receive impact loads causing the cap to crush before the load reaches the edge of the valve receptacle 12 at the end face 125.

The upper wall 16 of the valve protection cap 15 engages the end face 125 of the valve receptacle and lies flat across the end face with no space therebetween. The upper wall 16 of the valve protection cap is flat and circular and at the end face 125 of the valve receptacle includes a ring 161 molded as integral with the upper wall underneath the upper wall which extends into and engages the passage 126 at the upper portion 128 to transfer loading between the valve receptacle and the valve protection cap. The ring has an outer face matching an inner face of the portion 128 so as to provide intimate engagement therebetween when the cap is forced into place on the tank.

The upper wall 16 at the end face 125 of the valve receptacle includes a projecting cylindrical pin 20 underneath and integral with the upper wall 16 which extends into and engages into the passage 126 adjacent the valve body 14 to provide a seal with the passage to supplement the seal defined by the valve body in the passage. A sealing material 21, held in place by retaining ring 21A, in the passage surrounds the pin to improve the sealing action. Retaining ring 21A also acts to guide the pin 20 into the sealing material 21. Any movement of the cap 15 due to thermal changes or to slight misplacement will cause or allow slight sliding action of the pin 20 in the material 21 while maintaining the required sealing action as the components remain concentric and remain in contact.

The valve protection cap includes an annular skirt 22 extending downwardly from the peripheral wall into engagement with the wall 101 of the tank at a bottom edge 221 surrounding the opening 103 so as to transfer impact loads from the valve protection cap to the wall of the tank.

In FIGS. 1 and 3, the annular skirt extends 22 downwardly into engagement with the wall from a position 222 adjacent the upper wall 16. That is the depending skirt 22 is a separate component from the wall of the cap which engages onto the thread of the collar. This forms an additional part of the cap of much larger diameter than the collar and the wall 16 which defines a larger crush zone 223 to accept larger impact forces. In this embodiment the lower edge 221 of the wall is closely adjacent an outer wall of the tank to provide an improved protection. Ribs 224 on the exterior provide an improved hand grip.

In FIGS. 2 and 4 the annular skirt 22A extends downwardly into engagement with the wall of the tank 101 from a position adjacent the bottom edge 171 of the depending wall 17 so that the skirt is much smaller than the arrangement of FIG. 3. In this embodiment the bottom edge 22B engages the tank just outside the weld bead 112 around the opening 103.

Engagement between the cap and the collar is provided by engagement between the external male screw thread 115 and the female thread 18.

In FIGS. 1 and 3, the thread 18 on the cap is a continuous annular thread fully surrounding the interior of the cap so that the cap is screwed on to the tank and removed also by a screw action in the opposite direction. This provide a most effective connection and improved protection but requires more input from the user which may be resisted. Also this cap is larger and required more plastic in the molding which can increase cost.

In the alternative arrangement shown in FIGS. 2 and 4, the thread on the inside of the cap is not continuous but instead is formed on a plurality of separate sections 18A, 18B, 18C etc which at angularly spaced positions around the cap. These portions are individually displaceable in a radially outward direction so that the valve protection cap can be pushed axially on to the male screw thread by the sections moving outwardly to snap over the male thread. This avoids a screwing action although the cap can be screwed into place. As the sections carry female thread portions the cap should be removed rotationally by unscrewing the sections from the male thread. Reinforcing gussets 18D are provided in the interior between the top wall and the depending wall to improve transfer of impact forces.

As shown in the embodiment of FIGS. 2 and 4, there is a tear off tab projection 25 extending outwardly from one side of the depending peripheral wall at the bottom edge of the skirt 22A. This is a marker to show to the user that the tank is filled and ready for use. The tab 25 disconnects at a point 25A from the bottom edge portion of the peripheral wall when pulled providing an indication to the user that this tank has been put into use but the disconnection at point 25A leaves the peripheral wall intact. This provides a cap which can be used for refillable on the collar when the tank has been separated from the appliance.

In both embodiments the external ring presented to the use by the peripheral wall 22 in FIG. 3 or by the depending wall 17 has a surface which fully surrounds the collar without openings so as to provide complete protection around the full extent without possibility of penetration.

The invention claimed is:

1. A refillable supply tank for an inflammable gas comprising:

a tank body defining a container with a wall surrounding a hollow interior for receiving the gas and an opening in the wall;

a collar mounted in the opening and attached to the wall at the opening, the collar defining a central bore to allow gas to escape from the interior and to allow refillable gas to be fed into the interior;

a generally cylindrical valve receptacle distinct from the collar and carrying an external male screw thread engaged into an internal female screw thread in the bore of the collar;

the valve receptacle defining a passage therethrough extending from an end face of the valve receptacle into the interior of the tank body;

a valve body in the passage arranged to seal the passage against escape of the gas and operable to open the passage to allow the escape when required;

and a valve protection cap for covering the valve receptacle with the valve body therein and at least part of the collar;

the valve protection cap including an upper wall and at least one depending peripheral wall;

the valve protection cap including at least one engagement surface thereon which engages onto the outside of the collar;

wherein the upper wall of the valve protection cap includes at least one component which engages and cooperates with a cooperating component at the end face of the valve receptacle.

2. The refillable supply tank according to claim 1 wherein the collar has an outer peripheral surface of a larger diameter than an outer peripheral surface of the valve receptacle so that said at least one engagement surface of the valve protection cap is spaced outwardly of the outer peripheral surface of the valve receptacle.

3. The refillable supply tank according to claim 2 wherein said at least one depending peripheral wall is spaced outwardly of the outer peripheral surface of the valve receptacle so as to define an open shoulder area outside the end face of the valve receptacle underneath the upper wall of the valve protection cap which acts as a crush area to receive impact loads.

4. The refillable supply tank according to claim 1 wherein said at least one component of the upper wall of the valve protection cap at the end face of the valve receptacle comprises a ring underneath the upper wall which extends into and engages the passage to transfer loading between the valve receptacle and the valve protection cap.

5. The refillable supply tank according to claim 1 wherein said at least one component of the upper wall of the valve protection cap at the end face of the valve receptacle comprises a projecting pin underneath the upper wall of the valve protection cap which extends into and engages into the passage adjacent the valve body to provide a secondary seal with the passage to supplement the seal of the valve body in the passage.

6. A refillable supply tank for an inflammable gas comprising:

a tank body defining a container with a wall surrounding a hollow interior for receiving the gas and an opening in the wall;

a collar mounted in the opening and attached to the wall at the opening, the collar defining a central bore to allow gas to escape from the interior and to allow refillable gas to be fed into the interior;

a generally cylindrical valve receptacle distinct from the collar and carrying an external male screw thread engaged into an internal female screw thread in the bore of the collar;

the valve receptacle defining a passage therethrough extending from an end face of the valve receptacle into the interior of the tank body;

a valve body in the passage arranged to seal the passage against escape of the gas and operable to open the passage to allow the escape when required;

and a valve protection cap for covering the valve receptacle with the valve body therein and at least part of the collar;

the valve protection cap including an upper wall and at least one depending peripheral wall;

the valve protection cap including at least one engagement surface thereon which engages onto the outside of the collar;

wherein the valve protection cap includes an annular skirt extending downwardly from said at least one depending peripheral wall into engagement with the wall of the tank surrounding the opening so as to transfer impact loads from the valve protection cap to the wall of the tank.

7. The refillable supply tank according to claim 6 wherein the annular skirt extends downwardly into engagement with the wall of the tank from a position adjacent the upper wall of the valve protection cap.

8. The refillable supply tank according to claim 6 wherein the annular skirt extends downwardly into engagement with the wall of the tank from a position adjacent said at least one engagement surface.

9. The refillable supply tank according to claim 1 wherein the outside of the collar includes an external male screw thread and wherein said at least one engagement surface of the valve protection cap defines a female thread on a plurality of separate radially outwardly displaceable sections whereby the valve protection cap can be pushed axially on to the external male screw thread by outward displacement of the sections and can be removed rotationally by unscrewing the sections from the external male thread.

10. The refillable supply tank according to claim 1 wherein there is a tear off tab projection outwardly from one side of said at least one depending peripheral wall which disconnects from the peripheral wall providing an indication of use but leaving the peripheral wall intact to allow replacement on the collar.

11. The refillable supply tank according to claim 1 wherein said at least one depending peripheral wall has a surface which fully surrounds the collar without openings.

12. A refillable supply tank for an inflammable gas comprising:

a tank body defining a container with a wall surrounding a hollow interior for receiving the gas and an opening in the wall;

a valve support component mounted in the opening and defining a passage therethrough extending from an end face of the valve support component into the interior of the tank body;

a valve body in the passage arranged to seal the passage against escape of the gas and operable to open the passage to allow the escape when required;

and a valve protection cap for covering the valve support component with the valve body therein;

the valve protection cap including an upper wall and at least one depending peripheral wall which extends around the valve support component;

wherein the upper wall of the valve protection cap includes at least one component which engages and cooperates with a cooperating component at the end face of the valve support component;

wherein said at least one depending peripheral wall is spaced outwardly of an outer peripheral surface of the valve support component so as to define an open shoulder area outside the end face of the valve support component underneath the upper wall of the valve protection cap which acts as a crush area to receive impact loads.

13. A refillable supply tank for an inflammable gas comprising:

a tank body defining a container with a wall surrounding a hollow interior for receiving the gas and an opening in the wall;

a valve support component mounted in the opening and defining a passage therethrough extending from an end face of the valve support component into the interior of the tank body;

a valve body in the passage arranged to seal the passage against escape of the gas and operable to open the passage to allow the escape when required;

and a valve protection cap for covering the valve support component with the valve body therein;

the valve protection cap including an upper wall and at least one depending peripheral wall which extends around the valve support component;

wherein the upper wall of the valve protection cap at the end face of the valve receptacle includes a ring underneath the upper wall which extends into and engages the passage to transfer loading between the valve support component and the valve protection cap.

14. A refillable supply tank for an inflammable gas comprising:

a tank body defining a container with a wall surrounding a hollow interior for receiving the gas and an opening in the wall;

a valve support component mounted in the opening and defining a passage therethrough extending from an end face of the valve support component into the interior of the tank body;

a valve body in the passage arranged to seal the passage against escape of the gas and operable to open the passage to allow the escape when required;

and a valve protection cap for covering the valve support component with the valve body therein;

the valve protection cap including an upper wall and at least one depending peripheral wall which extends around the valve support component;

wherein the valve support component includes an external male screw thread and wherein the valve protection cap defines a female thread on a plurality of separate radially outwardly displaceable sections whereby the valve protection cap can be pushed axially on to the external male screw thread by outward displacement of the sections and can be removed rotationally by unscrewing the sections from the external male screw thread.

15. A refillable supply tank for an inflammable gas comprising:

a tank body defining a container with a wall surrounding a hollow interior for receiving the gas and an opening in the wall;

a valve support component mounted in the opening and defining a passage therethrough extending from an end face of the valve support component into the interior of the tank body;

a valve body in the passage arranged to seal the passage against escape of the gas and operable to open the passage to allow the escape when required;

and a valve protection cap for covering the valve support component with the valve body therein;

the valve protection cap including an upper wall and at least one depending peripheral wall which extends around the valve support component;

wherein there is a tear off tab projection outwardly from one side of said at least one depending peripheral wall which disconnects from the peripheral wall providing an indication of use but leaving the peripheral wall intact to allow replacement on the tank body.

16. The refillable supply tank according to claim 13 wherein said at least one component of the upper wall of the valve protection cap at the end face of the valve receptacle comprises a projecting pin underneath the upper wall of the valve protection cap which extends into and engages into the passage adjacent the valve body to provide a secondary seal with the passage to supplement the seal of the valve body in the passage.

17. The refillable supply tank according to claim 13 wherein said at least one depending peripheral wall is spaced outwardly of the outer peripheral surface of the valve receptacle so as to define an open shoulder area outside the end face of the valve receptacle underneath the upper wall of the valve protection cap which acts as a crush area to receive impact loads.

18. The refillable supply tank according to claim 13 wherein the valve protection cap includes an annular skirt extending downwardly from said at least one depending peripheral wall into engagement with the wall of the tank surrounding the opening so as to transfer impact loads from the valve protection cap to the wall of the tank.

* * * * *